(12) United States Patent
Draghetti

(10) Patent No.: US 12,319,455 B2
(45) Date of Patent: Jun. 3, 2025

(54) FILLING APPARATUS AND METHOD FOR AUTOMATICALLY FILLING CONTAINERS

(71) Applicant: I.M.A. INDUSTRIA MACCHINE AUTOMATICHE S.P.A., Ozzano Dell'Emilia (IT)

(72) Inventor: Fiorenzo Draghetti, Medicina (IT)

(73) Assignee: I.M.A. INDUSTRIA MACCHINE AUTOMATICHE S.P.A., Ozzano Dell'Emilia (BO) (IT)

( * ) Notice: Subject to any disclaimer, the term of this patent is extended or adjusted under 35 U.S.C. 154(b) by 0 days.

(21) Appl. No.: 18/562,138

(22) PCT Filed: May 20, 2022

(86) PCT No.: PCT/IT2022/050140
§ 371 (c)(1),
(2) Date: Nov. 17, 2023

(87) PCT Pub. No.: WO2022/244031
PCT Pub. Date: Nov. 24, 2022

(65) Prior Publication Data
US 2025/0033810 A1      Jan. 30, 2025

(30) Foreign Application Priority Data
May 20, 2021   (IT) .................. 102021000013220

(51) Int. Cl.
*B65B 37/10*     (2006.01)
*A24C 5/06*      (2006.01)
(Continued)

(52) U.S. Cl.
CPC ................ *B65B 37/10* (2013.01); *A24C 5/06* (2013.01); *B65B 1/08* (2013.01); *B65B 1/10* (2013.01);
(Continued)

(58) Field of Classification Search
CPC .... A24C 5/06; A24C 5/39; B65B 1/08; B65B 1/10; B65B 1/24; B65B 1/32; B65B 1/46; B65B 37/10; B65B 43/56
See application file for complete search history.

(56) References Cited

U.S. PATENT DOCUMENTS 3,404,742 A * 10/1968 Bonneric .................. B65B 1/34
                                                            222/77
11,382,352 B2 * 7/2022 Yamay ..................... A24C 5/54
(Continued)

FOREIGN PATENT DOCUMENTS

DE           3226654 A1      1/1984
EP           2889590 A1      7/2015
WO        2017025275 A1      2/2017

OTHER PUBLICATIONS

International Search Report and Written Opinion of PCT/IT2022/050140 dated Sep. 14, 2022, 11 pages.

*Primary Examiner* — Nicolas A Arnett
(74) *Attorney, Agent, or Firm* — Rankin, Hill & Clark LLP

(57) ABSTRACT

Filling apparatus (10) and method for automatically filling containers (100) for smoking articles with a desired metered quantity of incoherent material (M) of the fibrous type. The apparatus (10) comprises a first and a second filling station (A2, A4) each having one or more delivery devices (22) and being configured to deliver respectively a first and a second quantity of incoherent material (M) into each container (100), wherein the second filling station (A4) is disposed downstream of said first filling station (A2) along a working line.

15 Claims, 7 Drawing Sheets

(51) Int. Cl.
  *B65B 1/08* (2006.01)
  *B65B 1/10* (2006.01)
  *B65B 1/24* (2006.01)
  *B65B 1/32* (2006.01)
  *B65B 1/46* (2006.01)
  *B65B 43/56* (2006.01)
  *A24C 5/39* (2006.01)

(52) U.S. Cl.
  CPC ................ *B65B 1/24* (2013.01); *B65B 1/32* (2013.01); *B65B 1/46* (2013.01); *B65B 43/56* (2013.01); *A24C 5/39* (2013.01)

(56) References Cited

U.S. PATENT DOCUMENTS

| | | | | |
|---|---|---|---|---|
| 11,523,632 | B2* | 12/2022 | Giddings | A24C 5/54 |
| 11,659,858 | B2* | 5/2023 | Giddings | B65B 1/24 |
| | | | | 131/70 |
| 11,751,600 | B2* | 9/2023 | Ahn | A24C 1/28 |
| | | | | 131/74 |
| 2015/0183537 | A1* | 7/2015 | Canestri | B65B 1/36 |
| | | | | 53/436 |
| 2019/0320709 | A1* | 10/2019 | Kaufmann | A24C 5/06 |
| 2020/0068947 | A1* | 3/2020 | Leadbeater | A24C 5/34 |
| 2021/0022388 | A1* | 1/2021 | Sullivan | A24C 5/60 |
| 2021/0024232 | A1* | 1/2021 | Giddings | G06F 3/0484 |
| 2021/0030054 | A1* | 2/2021 | Godwin | A24C 5/02 |
| 2021/0392944 | A1* | 12/2021 | Kustal | A24C 5/54 |

* cited by examiner

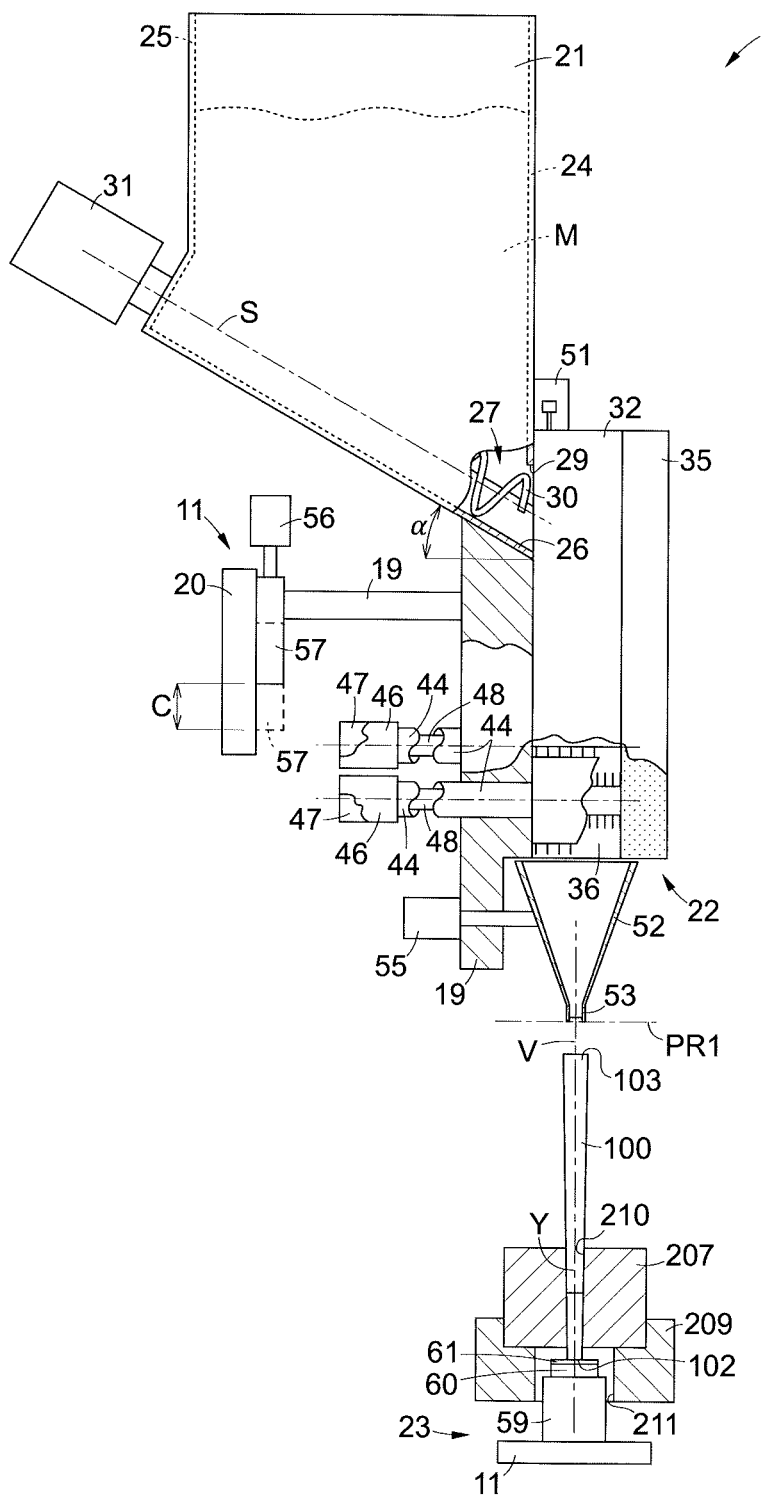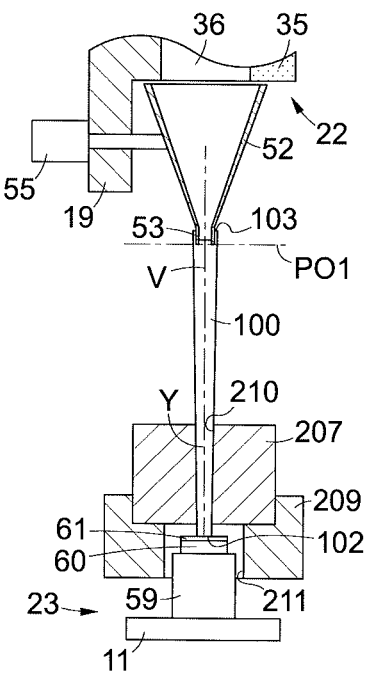
fig. 8
fig. 9

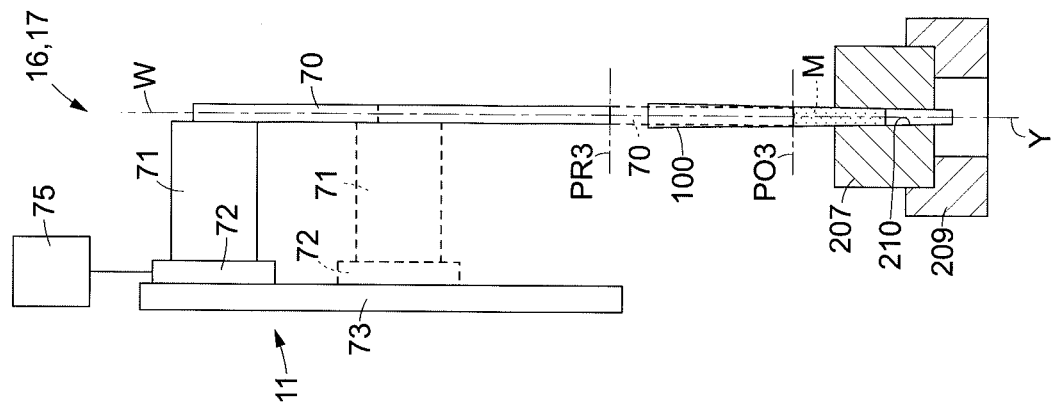
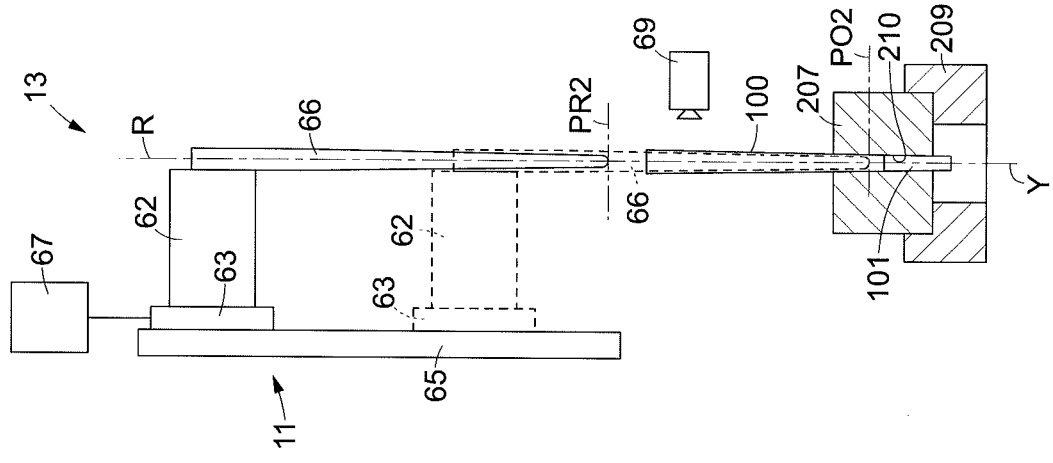
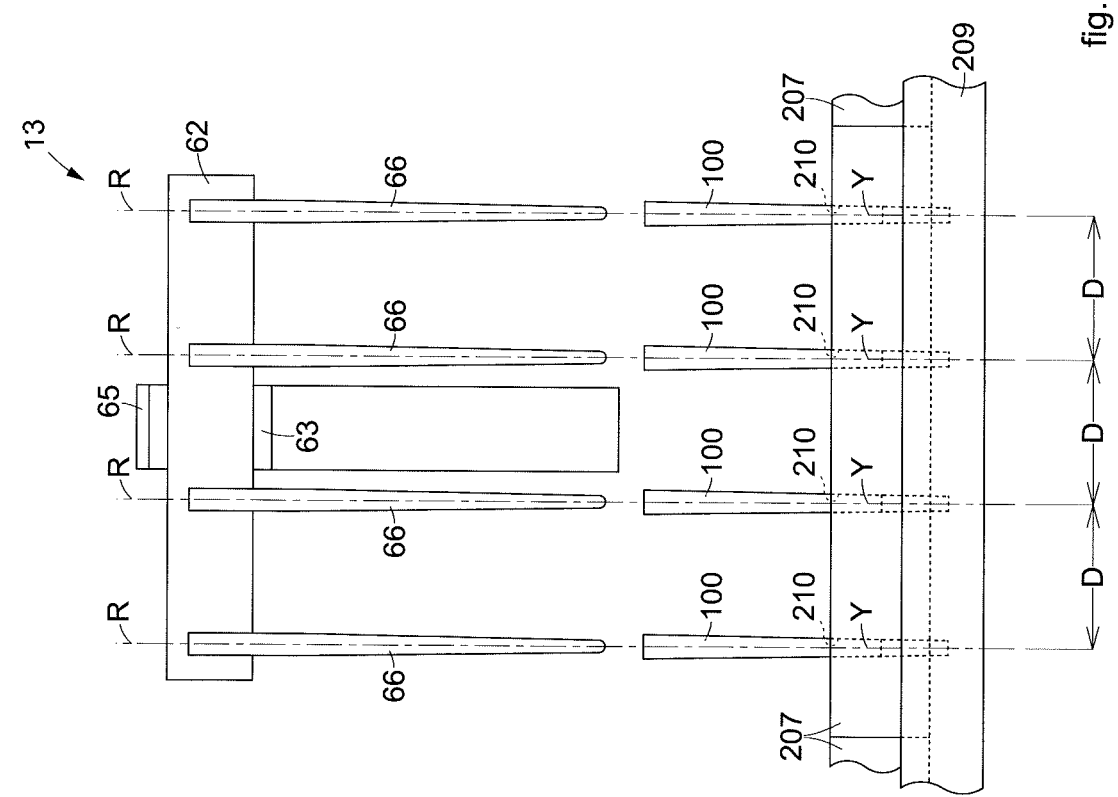

FILLING APPARATUS AND METHOD FOR AUTOMATICALLY FILLING CONTAINERS

FIELD OF THE INVENTION

The present invention concerns a filling apparatus and method for automatically filling empty containers, which can be for example casings for smoking articles or capsules. Each of the containers comprises an open end through which an incoherent material of the fibrous type can be inserted, which can have an oily and/or resinous nature. The apparatus and method according to the present invention are able to automatically carry out the precise and controlled filling of each container with very fast work cycles, so as to achieve a high productivity.

BACKGROUND OF THE INVENTION

In the automated production of smoking articles, such as for example cigarettes, or suchlike, especially using machines with high productivity, it is known that one of the important aspects to be taken into consideration and one of the technical problems to overcome is the insertion of smoking material, for example incoherent material, such as tobacco, other smokable substances, or a combination thereof, inside a container, for example a casing, in a filling station, with which there can also be associated a station for feeding containers, disposed upstream, and, disposed downstream, a packaging station, a distribution station and possibly also a station for packing the finished smoking articles.

With regards to the insertion of the smoking material, it is known to prepare a strip of paper on which to deposit the incoherent material, usually consisting of tobacco. The paper strip is then wrapped in order to form a single tubular casing containing the incoherent material, which is then cut to size in order to obtain the individual smoking articles, according to the desired format.

It is also known to use apparatuses for inserting the incoherent material as above inside the containers, which use pneumatic movement systems to move the incoherent material from a containing hopper to the inside of each container, which for example consists of a casing for smoking articles. Such known apparatuses have the disadvantage of degrading the chemical-physical characteristics of the incoherent material that they treat.

Known apparatuses for filling containers with metered quantities of smokable material are also described in patent documents DE 3226654 A1 and U.S. Pat. No. 3,404,742 A. These solutions provide a system capable of preparing a predetermined quantity of such material, typically lower than the desired metered quantity, to which one or more residual quantities can be selectively added after the weight of the quantities involved has been checked.

However, the above known techniques do not allow to automatically fill containers in order to obtain finished products which also contain, for example, leaf material other than tobacco, which has various peculiarities linked, above all, but not only, to the chemical-physical characteristics of the material and which can contain, for example, resins and oils. In particular, these substances make moving the incoherent material very difficult, since the material tends to stick to the surfaces with which it comes into contact and make the apparatus inefficient, especially when a high hourly productivity, for example of the order of 7,000 finished products, is to be achieved.

The technical problem that the present invention aims to resolve, in a new and original way, is that of providing an apparatus and perfecting a method for the automated filling of containers, and for this to also be done with incoherent materials comprising substances that make it difficult to feed them in very narrow spaces with very small sizes, such as for example a capsule or a casing for a smoking article, which is tubular and has a diameter of the order of a few millimeters, also taking into consideration that the metering has to be very precise, of the order of tenths of a gram, and that the aim is to achieve the high hourly productivity mentioned above, which implies that the average production time for each single finished product is of the order of approximately half a second.

At present, in fact, in the state of the art there are no filling apparatuses and methods which resolve the above technical problem, and which can achieve the above objectives.

Therefore, one purpose of the present invention is to provide a filling apparatus and to perfect a filling method for automatically filling containers, for example casings for smoking articles or capsules, which are simple and reliable and which at the same time allow to reach a high productivity, as indicated above, resolving the above technical problem.

Another purpose of the present invention is to provide a filling apparatus and to perfect a filling method for automatically filling containers which are capable of preventing the incoherent material from gluing or sticking to the surfaces of the feed elements, and can instead be easily conveyed to the inside of each container.

Another purpose of the present invention is to make available a filling apparatus and method for automatically filling containers which allow to obtain a very precise and reliable metering of the incoherent material inside each container and inside all the containers to be filled, so that all the containers contain exactly the same desired amount of incoherent material.

Another purpose of the present invention is to provide a filling apparatus and to perfect a filling method for automatically filling containers in which the filling of the containers can take place both serially and also in parallel, so that multiple containers can be filled simultaneously.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes and in order to resolve the technical problem described above in a new and original way, achieving surprisingly positive results, the present invention concerns a filling apparatus for automatically filling containers with a desired metered quantity of incoherent material of the fibrous type.

In accordance with one aspect of the present invention, the apparatus comprises a first filling station comprising a first filling assembly, having one or more delivery devices, which are configured to deliver a first quantity of incoherent material into each of the containers.

In accordance with one aspect of the present invention, the apparatus also comprises at least a second filling station disposed downstream of the first filling station along a working line and comprising a second filling assembly having an additional one or more delivery devices, which are configured to deliver a second quantity of the incoherent material into each of the containers, into which the first quantity of incoherent material has already been delivered in the first filling station.

In accordance with one aspect of the present invention, the apparatus also comprises pressing means disposed downstream of the first filling station and configured to be selectively inserted inside the containers after the first quantity of incoherent material has been delivered, in order to press the incoherent material before delivering the second quantity of incoherent material in the second filling station.

In accordance with one aspect of the present invention, the apparatus also comprises a third filling station disposed along the working line downstream of the second filling station and comprising a third filling assembly having an additional one or more delivery devices, which are configured to deliver a quantity of incoherent material that is complementary with respect to the sum of the first and second quantities, so as to obtain the desired metered quantity of incoherent material.

In accordance with another aspect of the present invention, the pressing means comprise first pressing members, disposed in a first pressing station which is located downstream of the first filling station and upstream of the second filling station, to press the first quantity of incoherent material before the second filling station delivers the second quantity of incoherent material.

In accordance with another aspect of the present invention, the pressing means comprise second pressing members, disposed in a second pressing station which is located downstream of the second filling station and upstream of the third filling station, to press the second quantity of incoherent material before the third filling station delivers the complementary quantity of incoherent material, until the desired metered quantity of incoherent material is reached.

In accordance with one aspect of the present invention, each of the delivery devices comprises weighing means to weigh the incoherent material, and the apparatus also comprises control means configured to command the delivery devices as a function of the weighing carried out by the weighing means in order to progressively deliver, as the containers advance along the working line, the desired metered quantity of incoherent material.

In accordance with another aspect of the present invention, the filling apparatus also comprises shaping means disposed upstream of the first filling station and configured to be selectively inserted into the empty containers in order to eliminate any wrinkles, or folds, present therein.

In accordance with another aspect of the present invention, each delivery device comprises a first rotating member and a second rotating member which define means for metering the incoherent material, and which cooperate with each other to deliver a determinate metered quantity of incoherent material into each of the containers, which is equal to a fraction of the desired metered quantity.

In accordance with another aspect of the present invention, the first rotating member and the second rotating member are configured to rotate at respective angular velocities, different from each other, and in opposite directions of rotation, so that together they convey the incoherent material toward the containers.

In accordance with another aspect of the present invention, each of the one or more delivery devices comprises a conveying member having the shape of a funnel, with a wider part at the top, disposed below the first and second rotating members, and a narrower part at the bottom, configured and sized to be selectively inserted into one of the containers.

In accordance with another aspect of the present invention, the conveying member is of the vibrating type, configured to be made to vibrate during the delivery of the incoherent material, so as to prevent the incoherent material that has been delivered by the first and second rotating members from accidentally remaining inside the conveying member.

In accordance with another aspect of the present invention, the conveying member is connected to a respective actuator capable of moving the conveying member so as to make it vibrate.

In accordance with another aspect of the present invention, the conveying member, in correspondence with the narrowest part at the bottom, occupies a surface measured on a horizontal section smaller than 150 mm$^2$.

In accordance with another aspect of the present invention, the first rotating member is provided on its cylindrical surface with a plurality of sharp elements distributed angularly at regular intervals and aligned on a plurality of parallel rows; moreover, the second rotating member has a diameter smaller than the diameter of the first rotating member and it is provided on its cylindrical surface with a plurality of teeth distributed angularly at regular intervals, aligned on a plurality of parallel rows and axially offset with respect to the sharp elements.

In accordance with another aspect of the present invention, a filling method according to the present invention, for automatically filling containers with a desired metered quantity of an incoherent material of the fibrous type, comprises a delivery step in which one or more delivery devices deliver into each of the containers a determinate quantity of the incoherent material which is a fraction of the desired metered quantity.

In accordance with another aspect of the present invention, the delivery step comprises a first sub-step of filling the containers with a first quantity of incoherent material, carried out in a first filling station comprising a first filling assembly which comprises at least one of the delivery devices. The method also comprises at least a second sub-step of filling the containers with a second quantity of incoherent material, carried out in a second filling station disposed downstream of the first filling station along a working line, and comprising a second filling assembly having an additional one or more delivery devices, which are configured to deliver a second quantity of incoherent material into each of the containers into which the first quantity of incoherent material has already been delivered in the first filling sub-step.

In accordance with another aspect of the present invention, the method also comprises at least one pressing step, following the first filling sub-step, carried out by means of pressing means disposed downstream of the first filling station, in which the pressing means are selectively inserted inside the containers, already at least partly filled with the incoherent material, in order to press the latter.

In accordance with another aspect of the present invention, the delivery step also comprises a third filling sub-step, carried out in a third filling station which is disposed along the working line downstream of the second filling station and comprising a third filling assembly having an additional one or more delivery devices, which are configured to deliver a quantity of incoherent material which is complementary with respect to the sum of the first and second quantities, so as to obtain the desired metered quantity of incoherent material.

In accordance with another aspect of the present invention, in the first filling sub-step it is provided to deliver a first quantity comprised between 25% and 35% of the desired metered quantity of incoherent material, in the second filling sub-step it is provided to deliver a second quantity comprised between 45% and 55% of the desired metered quantity of incoherent material, and in the third filling sub-step it is provided to deliver a complementary quantity comprised between 15% and 25% of the desired metered quantity of incoherent material.

In accordance with another aspect of the present invention, according to a preferred embodiment of the method, in the first filling sub-step it is provided to deliver approximately 30% of the desired metered quantity of incoherent material, in the second filling sub-step it is provided to deliver approximately 50% of the desired metered quantity of incoherent material, and in the third filling sub-step it is provided to deliver approximately 20% of the desired metered quantity of incoherent material.

In any case, in the last filling step provided, which in the embodiments described here is the third filling sub-step, it is provided to deliver a quantity of incoherent material which is complementary with respect to the one already previously delivered inside the containers, with reference to the desired metered quantity with which the latter have to be filled.

This distribution of the quantities delivered in the different filling stations advantageously allows to dispose weighing members that have great sensitivity, reliability and speed of execution of the measurements, only in the last filling station, that is, in the third filling station. This allows to dispose less performing, and therefore less expensive, weighing members in the previous filling stations, that is, in the first and second filling stations.

In accordance with another aspect of the present invention, the method also comprises a first pressing step carried out by first pressing members in a first pressing station disposed downstream of the first filling station and upstream of the second filling station, to press the first quantity of incoherent material, and a second pressing step carried out by second pressing members in a second pressing station disposed downstream of the second filling station and upstream of the third filling station to press the second quantity of incoherent material.

In accordance with another aspect of the present invention, the filling method also comprises a shaping step, before the delivery step, carried out by means of shaping means disposed upstream of the first filling station, so as to selectively insert the shaping means into the empty containers in order to eliminate any wrinkles, or folds, present in the containers.

In accordance with another aspect of the present invention, the method provides to deliver the quantities of incoherent material by making a first rotating member and a second rotating member rotate, which are comprised in each of the delivery devices and reciprocally cooperate to deliver the quantities of incoherent material.

In accordance with another aspect of the present invention, the method also comprises making a conveying member rotate, which is comprised in each of the delivery devices and substantially has the shape of a funnel with a wider part at the top, disposed below the first and second rotating members, and a narrower part at the bottom, configured and sized to be selectively inserted into one of the containers.

In accordance with another aspect of the present invention, the method comprises both a weighing step, in which it is provided to weigh the incoherent material by means of weighing means comprised in each of the delivery devices, and also a step of controlling the delivery step by means of control means which are configured to command the delivery devices as a function of the weighing carried out by the weighing means, in order to progressively deliver, as the containers advance along the working line, the desired metered quantity of incoherent material.

In accordance with another aspect of the present invention, the weighing and control steps preferably take place continuously, or at programmed time intervals, during the delivery step.

In accordance with another aspect of the present invention, the method also comprises a step of transporting the containers by means of a transport apparatus which comprises a transport member configured to slide on a fixed guide, wherein the transport step provides to transport the containers along the working line parallel to a direction of working, sequentially passing at least in the first filling station and in the second filling station and stopping in each of them for a period of time equal to the cycle time, so as to allow the partial and progressive filling of the containers.

In accordance with another aspect of the present invention, the method provides to carry out, in sequence, the shaping step, the first filling sub-step in which a first quantity of incoherent material is delivered, the first step of pressing the first quantity by means of a first pressing station disposed downstream of the first filling station and upstream of the second filling station, the second filling sub-step in which a second quantity of incoherent material is delivered, a second step of pressing the second quantity in a second pressing station disposed downstream of the second filling station and upstream of the third filling station, and finally the third filling sub-step.

DESCRIPTION OF THE DRAWINGS

These and other aspects, characteristics and advantages of the present invention will become apparent from the following description of some of its embodiments, given as a non-restrictive example with reference to the attached drawings wherein:

FIG. 8 is a partly sectioned lateral view of the portion of the apparatus shown in FIG. 4, in which the apparatus is shown in an idle position;

FIG. 9 is a view like that of FIG. 8, which shows the apparatus in an operating position;

FIG. 10 is a front view, on an enlarged scale, of another portion of the apparatus of FIG. 1;

FIG. 11 is a partly sectioned lateral view of the portion of FIG. 10;

FIG. 12 is a partly sectioned lateral view of another detail, on an enlarged scale, of the apparatus of FIG. 1;

Figure 1:
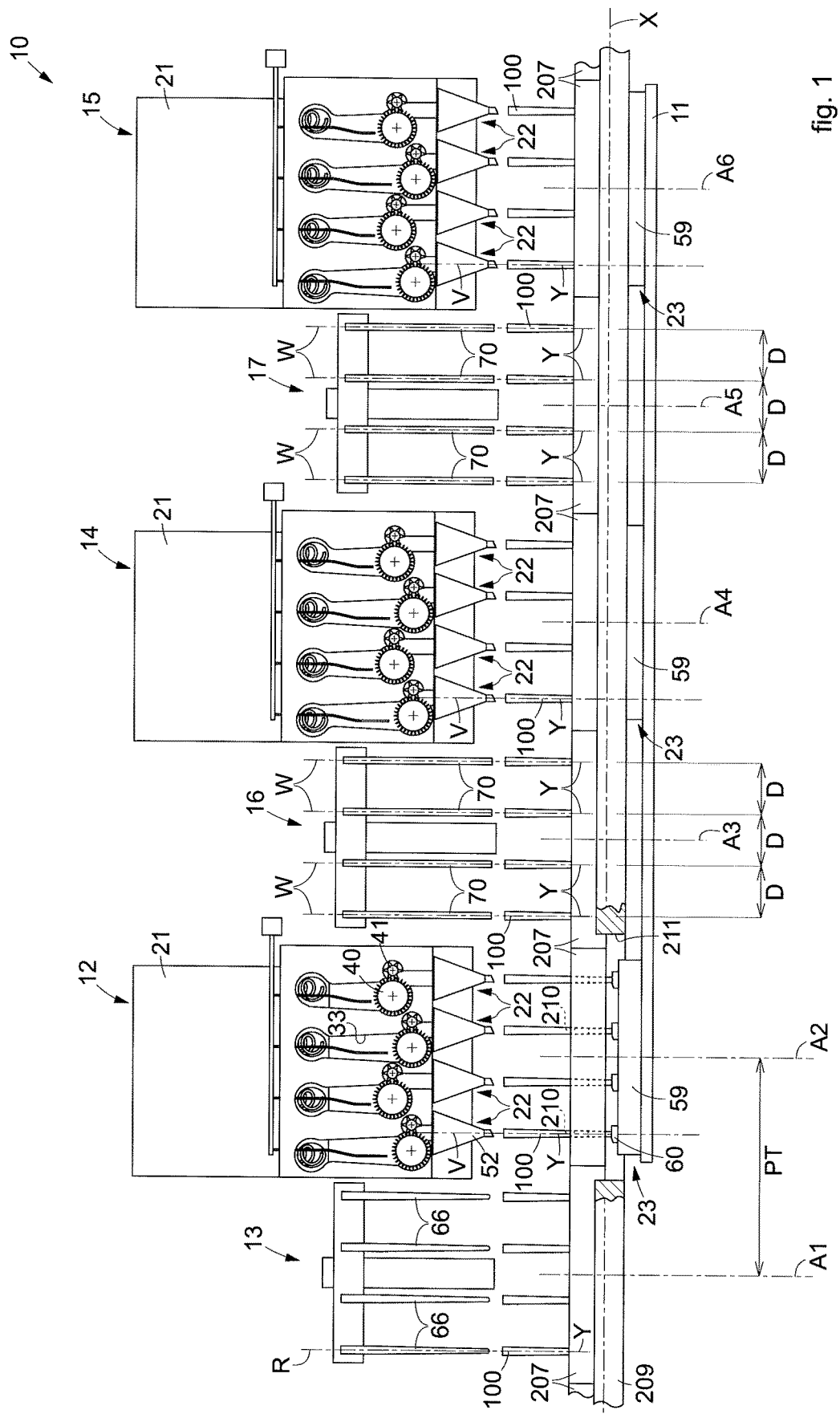
FIG. 1 is a front view that schematically shows a filling apparatus according to the present invention, in accordance with one embodiment.

We must clarify that in the present description and in the claims the phraseology and terminology used, such as for example the terms horizontal, vertical, front, rear, high, low, internal and external, with their declinations, have the sole function of better illustrating the present invention with reference to the drawings and must not be in any way used to limit the scope of the invention itself, or the field of protection defined by the attached claims.

Furthermore, the people of skill in the art will recognize that certain sizes or characteristics in the drawings may have been enlarged, deformed, or shown in an unconventional or non-proportional way in order to provide a version of the present invention that is easier to understand. When sizes and/or values are specified in the following description, the sizes and/or values are provided for illustrative purposes only and must not be construed as limiting the scope of protection of the present invention, unless such sizes and/or values are present in the attached claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to FIG. 1, a filling apparatus 10, according to the present invention, for automatically filling containers 100 (FIG. 3), for example casings for smoking articles or capsules, is configured to be associated with, or to be part of, a machine 200 (FIG. 2) for the preparation of smoking articles, such as for example cigarettes, capsules, or suchlike.

The apparatus 10 is configured to fill the containers 100 with a fibrous material, for example incoherent material M, of an oily and/or resinous nature such as leaf material, chopped or shredded, derived from tobacco or other plants, or other substances, for example of the smokable type, or a combination thereof.

Figure 2:
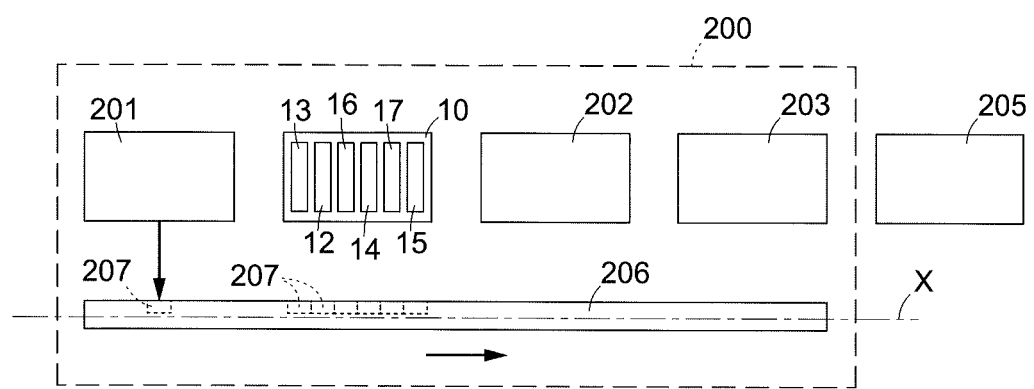
FIG. 2 is a block diagram of a machine that comprises, or which can be associated with, the apparatus of FIG. 1.

The machine 200 is schematized in the block diagram of FIG. 2 and, for example, comprises, in sequence, a feed station 201 configured to feed containers 100, followed by the apparatus 10, which constitutes the filling station, by a packaging station 202 configured to package the already filled containers 100, for example to adequately close them, producing finished products such as smoking articles or capsules, and by a distribution station 203, for example to forward the finished products toward a packing station 205, possibly outside the machine 200; however, the machine 200 is not limited to this. The machine 200 can also comprise a suitable transport apparatus 206 having the function of transporting the containers 100 along the entire working line from the feed station 201 (on the left in FIG. 2) to the packing station 205 (on the right in FIG. 2), for example along a direction of working X, preferably rectilinear and horizontal; however, the machine 200 is not limited to this.

The feed station 201, the packaging station 202, the distribution station 203, the packing station 205 and the transport apparatus 206 can be of any known type whatsoever, or one that will be developed in the future. Alternatively, the transport apparatus 206 can be, for example, of the type described in a correlated patent application for industrial invention filed by the same Applicant as the present patent application.

For example, the transport apparatus 205 comprises a transport member 207, having the shape and function of a shuttle, which is configured to slide on a fixed guide 209 in the direction of working X. In the example provided here, the transport member 207 comprises four seatings 210, hollow and made through, each of which has, for example, a truncated cone shape with sizes mating with those of a container 100, or at least a lower part thereof. In the example provided here, the sizes of each seating 210 are such that each container 100, when it is inserted in the seating 210, protrudes not only from the upper surface of the transport member 207, but also from the base of the latter, by a few millimeters (FIGS. 1, 4, 5, 6, 8, 9, 10).

It is clear that the number of seatings 210 can also be different from four, it being understood that their number influences the hourly productivity of the machine 200. In fact, if a determinate cycle time TC expressed in seconds is required in order to perform a work cycle in each of the different stations 201, 202, 203 and 205 and in the apparatus 10, or in a slower one, the hourly productivity of the machine 200 will be equal to 3,600 divided by the cycle time TC, multiplied by the number of seatings 210 of each transport member 207. In fact, in the four seatings 210 the work occurs in parallel.

Each seating 210 is symmetrical with respect to a substantially vertical axis Y and is configured to house a container 100 inserted vertically from the top downward (FIGS. 4, 5, 9, 10).

The distance D between two adjacent seatings 210 is defined in the design phase of the apparatus 10 and/or of the machine 200, and it is suitable to manage the plurality of containers 100, as will be described in detail below.

By way of a non-limiting indication, the machine 200 is able to prepare each product, such as a smoking article or a capsule, in a very short time, that is, with a cycle time TC of approximately two seconds, therefore it can have an hourly productivity of about 7,000 smoking articles, precisely because in each of the stations 201, 202, 203 and 205 and in the apparatus 10, four containers 100 are worked simultaneously and therefore in parallel in order to shape, for example, filled smoking articles or capsules.

Figure 3:
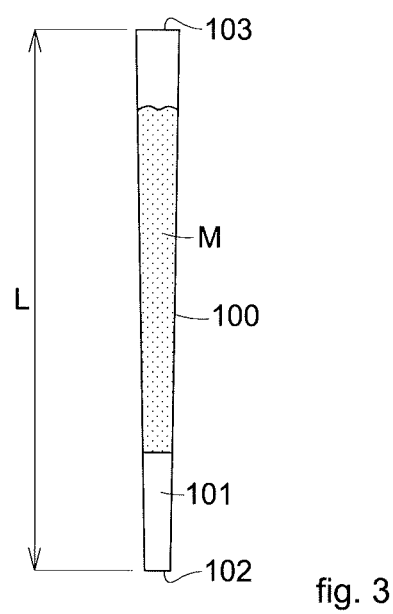
FIG. 3 is a schematic lateral view of a container suitable to be treated by the apparatus of FIG. 1
Figure 4:
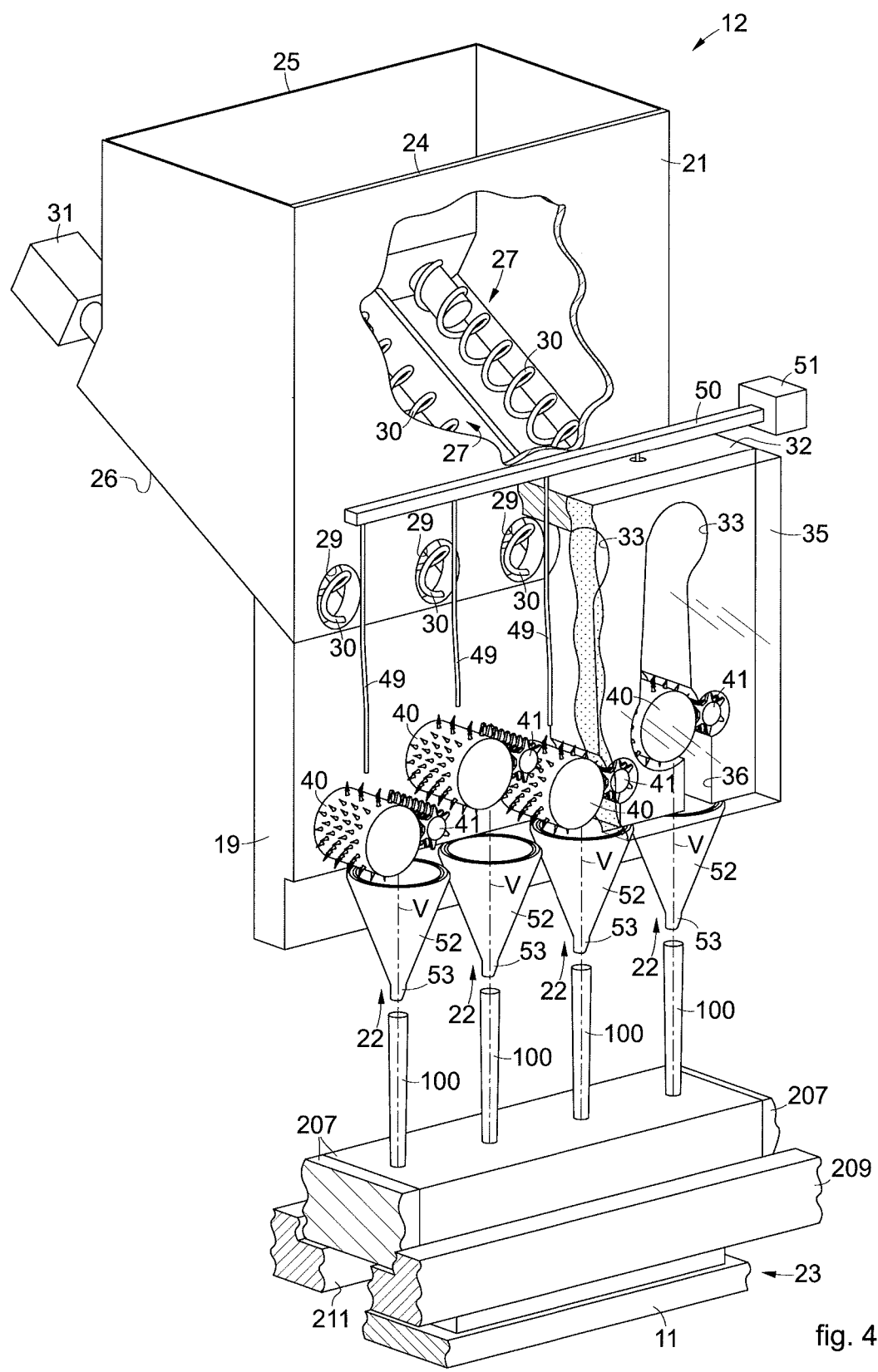
FIG. 4 is a schematic and simplified three-dimensional view, on an enlarged scale, of a portion of the apparatus of FIG. 1.

Before describing the apparatus 10 and its operation in detail, we will now describe an example of a container 100 (FIG. 3). In particular, in the following description, the container 100 is conformed as a casing for producing smoking articles; however, it could also be a capsule or any other type of container suitable to contain the incoherent material M.

Each container 100 is made of sheet material, for example very thin paper, or other material suitable to make a cigarette, or other smokable product, and it is normally provided with a filter 101 of a known type.

The containers 100 have a length L which can vary according to the smoking article to be obtained and it is comprised, for example, between about 60 mm and about 150 mm.

Furthermore, each container 100 can have a truncated cone shape and comprise a first end 102 in correspondence with the filter 101 and a second open end 103 with a diameter larger than the first end, and configured for the insertion of the incoherent material M inside the container 100. On average, the diameter of each container 100 is of the order of a few millimeters, for example from 6 to 8, like that of a traditional cigarette.

If the container 100 were a capsule, it would for example have a truncated cone or hemispherical shape and it would also comprise a first end, closed, and a second end, opposite the first end, open and configured for the insertion of the incoherent material M.

The apparatus 10 (FIG. 1) comprises a series of work units mounted on a fixed structure 11, each disposed in a respective work station. The work units and stations are disposed sequentially and contiguous to each other along a working line parallel to the direction of working X; the disposition with which the work units and stations are disposed on the working line is such that there is a progressive order of intervention from left to right, looking at FIG. 1, as will be clear from the description of the operation of the apparatus disclosed below.

In accordance with one embodiment of the present invention, the work units comprise at least a first filling assembly 12 configured to fill the containers 100 with the incoherent material M (FIG. 3) and which will be described in detail below.

In accordance with another embodiment of the present invention, upstream of the first filling assembly 12 there is a shaping assembly 13 (FIG. 1).

In accordance with other embodiments of the present invention, the work units also comprise a second filling assembly 14 and possibly also a third filling assembly 15, which are the same as the first filling assembly 12.

In accordance with other embodiments of the present invention, the work units also comprise first pressing means, or a first pressing assembly 16, disposed downstream of the first filling assembly 12, and possibly also second pressing means, or a second pressing assembly 17, disposed downstream of the second filling assembly 15.

The first filling assembly 12 (FIG. 8) comprises a mobile structure 19 sliding vertically on a vertical guide 20 of the fixed structure 11.

On the upper part of the mobile structure 19 there is mounted a hopper 21 suitable to contain the incoherent material M to be used to fill the containers 100, and below which there are disposed four delivery devices 22 (FIGS. 4 and 5), each configured to fill a container 100 disposed on a seating 210 of the transport member 207.

The first filling assembly 12 also comprises weighing means, configured for example as a weighing unit 23 (FIGS. 5, 6, 8 and 9) disposed below the four delivery devices 22 and suitable to weigh each container 100 during a first filling sub-step provided in a step of delivery of the incoherent material M into the containers 100, as will be described in detail below.

The hopper 21 comprises at least a front wall 24, a rear wall 25, both vertical, and a base 26 inclined downward by an angle α (FIG. 8), for example comprised between about 30° and about 45°.

Inside the hopper 21 there are disposed four feed members 27, each disposed along a corresponding feed axis S parallel to the base 26. Please note that the hopper 21 and the four feed members 27 define means for feeding the incoherent material M.

On the lower part of the front wall 24 of the hopper 21 there are four through holes 29 (FIG. 5), substantially centered with respect to the feed axes S and configured to allow the outflow of the incoherent material M moved by the feed members 27 toward the corresponding delivery devices 22.

Each feed member 27 comprises a movement element 30 (FIGS. 4 and 5), for example with a helical shape, attached on the rotating shaft of a first actuator 31 (FIG. 8) mounted on the rear wall 25 of the hopper 21 and configured to make the movement element 30 rotate, causing a motion of advance of the incoherent material M toward the corresponding hole 29, substantially without exerting any compression on the material itself.

According to one variant, not shown in the drawings, a single first actuator 31 could make the four movement elements 30 rotate simultaneously.

On the internal surface of the base 26, that is, inside the hopper 21, and below each movement element 30 (FIGS. 4 and 5) a groove is created, configured to promote the outflow of the incoherent material M toward the corresponding hole 29.

In one embodiment of the present invention, the four delivery devices 22 are made using a same plate 32, substantially vertical, attached on the mobile structure 19 (FIG. 8) and shaped so as to have four substantially vertical conveying cavities 33 (FIGS. 4 and 5), one for each delivery device 22, in the upper part of which the four holes 29 open. Each conveying cavity 33 is configured to vertically guide the incoherent material M coming from the hopper 21 and is shaped so as not to hinder its downward fall.

The four conveying cavities 33 are closed at the front by a closing plate 35 (FIG. 8), which can be made of transparent material, for example plastic or glass, in order to allow the flow of incoherent material M inside them to be viewed.

Figure 7:
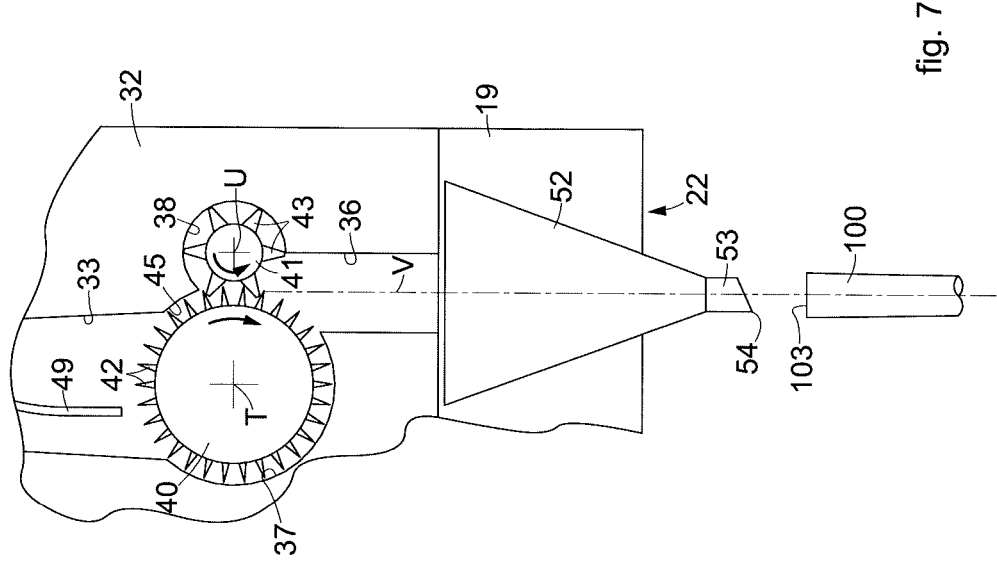
FIG. 7 is an enlarged front view of another detail of FIG. 5.
Figure 6:
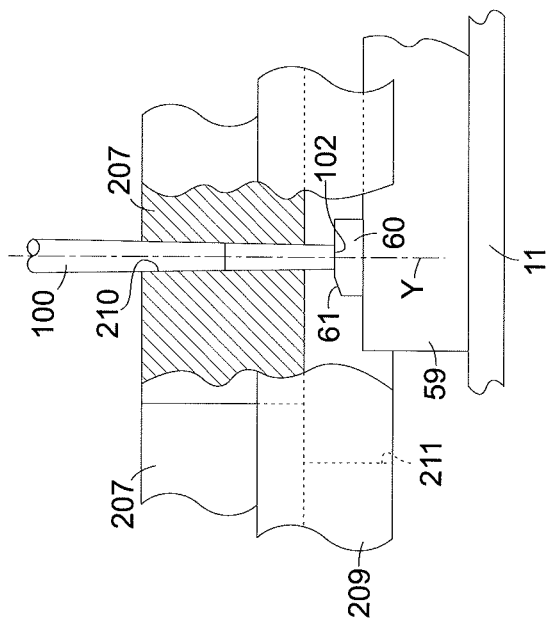
FIG. 6 is a partly sectioned and enlarged front view of a first detail of FIG. 5.

Each conveying cavity 33 is shaped in such a way as to have, in its lower part, an exit aperture 36 (FIGS. 5 and 7) aligned along a vertical axis V and in proximity of which two seatings 37 and 38 are made, first and second seating respectively, which are disposed on opposite sides with respect to the vertical axis V. In particular, the two seatings 37 and 38 are defined by partly cylindrical surfaces and have a common zone. Two metering rollers 40 and 41 are mounted rotatable in the two seatings 37 and 38, rotating in reciprocally opposite directions about two respective substantially horizontal axes of rotation T and U, which are also disposed on opposite sides with respect to the vertical axis V. Each axis of rotation T is substantially vertically aligned with the corresponding hole 29. In the example provided here, each first metering roller 40 is configured to rotate in a clockwise direction in order to convey the incoherent material M coming from the hopper 21 toward the corresponding exit aperture 36.

The four vertical axes V are distanced from each other by the same distance D by which the seatings 210 of a same transport member 207 are distanced.

In the embodiment described here, the axes of rotation T and U of each delivery device 22 lie on a same horizontal plane P1 or P2. Furthermore, in order to optimize the overall sizes and to respect the distance D between the vertical axes V, the horizontal planes P1 and P2 of each delivery device 22 are offset vertically with respect to each other. For example, with reference to FIG. 5, the horizontal plane P1 associated with the first and with the third delivery device 22, starting from the left, is lower than the horizontal plane P2 associated with the second and with the fourth delivery device 22.

The first metering roller 40 of each delivery device 22 is provided with a plurality of sharp elements 42 on its cylindrical surface (FIG. 7), which are angularly distributed at regular intervals, for example one approximately every 12°, and are aligned on a plurality of rows parallel to the axis of rotation T. The external diameters of the sharp elements 42 are slightly smaller than the diameter of the corresponding first seating 37.

The second metering roller 41 of each delivery device 22 has a diameter smaller than the diameter of the first metering roller 40, and it is provided with a plurality of teeth 43 on its cylindrical surface which are angularly distributed at regular intervals, for example one approximately every 60°, and are aligned on a plurality of rows parallel to the axis of rotation U and axially offset with respect to the sharp elements 42. The external diameters of the teeth 43 are slightly smaller than the diameter of the corresponding second seating 38.

Furthermore, in each delivery device 22 the center distance between the axes of rotation T and U, the diameters of the metering rollers 40 and 41, and the external diameters of the sharp elements 42 and of the teeth 43 are chosen so that the latter intersect each other along the vertical axis V, without touching.

The first metering roller 40 is configured to rotate at a first relatively low angular velocity ω1, of the order of about 25 revolutions per minute, and has the function of conveying, with the sharp elements 42, the incoherent material M coming from the hole 29 and directing it toward the second metering roller 41, which is instead configured to rotate in the opposite direction, that is, counterclockwise, at a second relatively high angular velocity @2, of the order of about 750 revolutions per minute.

Furthermore, in each conveying cavity 33, a sector 45 of the first seating 37 adjacent to the second seating 38 defines a calibrated passage for the incoherent material M, so as to be able to easily control the quantity of the latter fed by the first metering roller 40 toward the second metering roller 41 and then carry out a precise metering of the incoherent material M, as a function of the amplitude of the rotation of the first metering roller 40.

The second metering roller 41, rotating at the second relatively high angular velocity @2, has the function of completely removing the incoherent material M in contact with the first metering roller 40 and pushing it downward, substantially in the direction of the vertical axis V, into the exit aperture 36.

The four first metering rollers 40 are made to selectively rotate by four corresponding second actuators 46 (FIG. 8), connected to them by means of four corresponding shafts 44. The four second metering rollers 41 are made to selectively rotate by four corresponding third actuators 47, connected to them by means of four corresponding shafts 48. For simplicity, FIG. 8 schematically shows only two second actuators 46 and two third actuators 47.

Alternatively, a single actuator, or a different number of actuators, could command two or more metering rollers 40 and/or 41.

Inside each of the four conveying cavities 33 there is an agitation member 49 (FIGS. 4 and 5), for example comprising or consisting of a vertical rod, possibly curvilinear, configured to promote the descent of the incoherent material M toward the corresponding first metering roller 40.

The four agitation members 49 (FIG. 5), for example, are mounted on a horizontal bar 50 disposed above the plate 32. A fourth actuator 51 is connected to the horizontal bar 50 in order to move it so that the four agitation members 49 can vibrate and/or move inside the corresponding four conveying cavities 33.

Each delivery device 22 also comprises a conveying member 52 (FIGS. 5, 7, 9 and 9), having substantially the shape of a funnel, disposed below the exit aperture 36 and close to the latter, coaxially to the corresponding vertical axis V.

Figure 5:
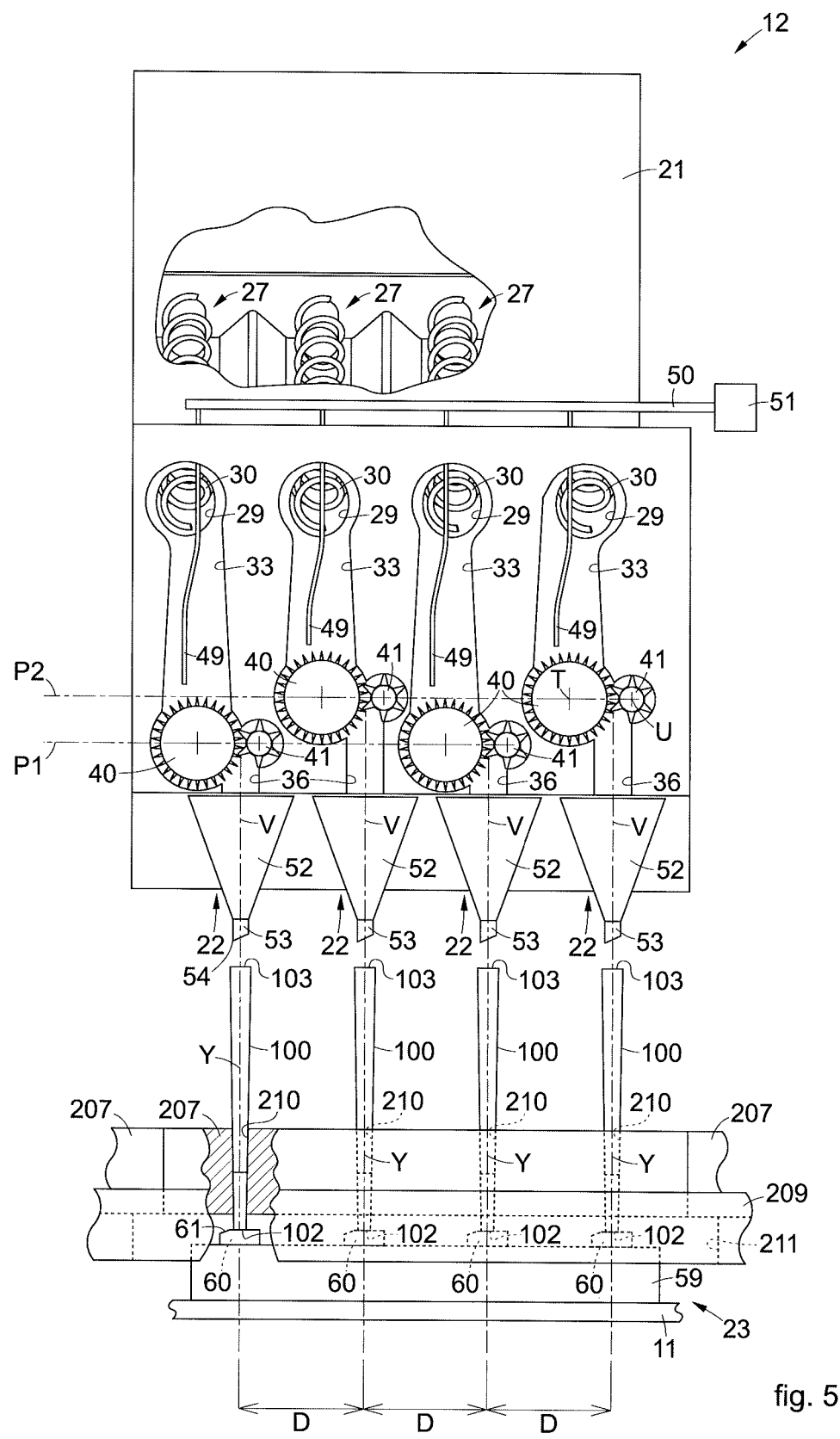
FIG. 5 is a partly sectioned front view of the portion of the apparatus shown in FIG. 4.

Each conveying member 52 is configured to receive the incoherent material M coming from the exit aperture 36 and convey it inside a container 100. In particular, each conveying member 52 has a lower part 53 with a cylindrical tubular shape, having an external diameter slightly smaller than the diameter of the second end 103 (FIGS. 3 and 7) of a container 100. By way of a non-limiting example, the surface measured on a horizontal section in correspondence with the lower part 53 is comprised between about 75 and about 115 mm$^2$, and in any case is smaller than about 150 mm$^2$. The lower part 53 has a terminal end truncated diagonally in the opposite direction to the direction of working X, in order to generate a pointed end 54 (FIG. 5). In fact, during the operation of the apparatus 10, each lower part 53 is selectively partly introduced into the second end 103 of a container 100, as will be described in detail below, and this conformation of the lower part 53 facilitates its introduction inside the container 100.

The four conveying members 52 are connected to one or more fifth actuators 55 (FIGS. 8 and 9) capable of making them vibrate in order to facilitate the outflow of the incoherent material M downward, and therefore toward the corresponding containers 100.

The selective vertical movement of the mobile structure 19 with respect to the vertical guide 20, in order to displace the lower parts 53 of the four conveying members 52 between an idle position PR1 thereof (FIG. 8), in which the same lower parts 53 are raised by a few millimeters with respect to the underlying containers 100, and a lowered operating position PO1 (FIG. 9), in which the lower parts 53 are inserted in the second ends 103 of the containers 100, and vice versa, is commanded by a sixth actuator 56 (FIG. 8), connected to a first slider 57, sliding on the vertical guide 20. The first slider 57 is therefore part of the mobile structure 19. The extent of the travel C of the first slider 57, which is equal to the distance between the two positions PR1 and PO1, depends on the length L of the container 100.

The weighing unit 23 (FIGS. 1, 5, 6, 8 and 9) is disposed below the transport member 207 and is partly housed in a lower cavity 211 of the fixed guide 209.

The weighing unit 23 comprises a support plate 59 attached to the fixed structure 11 and on which there are mounted four weighing members 60 coaxial to the four vertical axes V and each comprising, or consisting of, for example, a load cell of a type known per se.

Each weighing member 60 (FIG. 6) comprises an inclined wall 61, configured to accompany the second end 102 of the container 100 above it while the same container 100 is moved in the direction of working X by means of the transport member 207. The container 100 stops in a substantially central position with respect to the weighing member 60 in order to be weighed both when it is empty and also when it is at least partly filled with the incoherent material M.

In accordance with another embodiment, not shown in the drawings, each weighing member 60 is configured to be axially displaced by a corresponding actuator between an idle position, in which it is slightly distant from the corresponding first end 102 of the container 100, and a raised operating position, in which it is raised and in contact with the same end 102, in order to weigh the same container 100 both when it is empty and also when it is at least partly filled with the incoherent material M.

The shaping assembly 13 (FIGS. 1, 10 and 11) is disposed adjacent to the feed station 201 (FIG. 2) and has the function of eliminating any wrinkles, or folds, present in the containers 100, in particular in the case of casings for smoking articles such as that described with reference to FIG. 3, before proceeding with their filling, as will be described in detail below.

The shaping assembly 13 (FIGS. 10 and 11) comprises a substantially horizontal support element 62, mounted on a second slider 63, sliding vertically on a vertical guide 65 of the fixed structure 11. On the support element 62 there are attached for conical elements 66 that are the same as each other and each have shapes and sizes substantially mating with those of the internal part of a container 100. The four conical elements 66 are disposed on corresponding vertical axes R which are distanced from each other by the same distance D by which the seatings 210 of a same transport member 207 are distanced.

A seventh actuator 67 (FIG. 11), of a type known per se, is connected to the second slider 63 in order to command its selective lowering from an idle position PR2, in which the conical elements 66 are distant from the underlying containers 100, to a lowered operating position PO2, in which the same conical elements 66 are inserted inside the containers 100, for example up to the proximity of their filter 101, and vice versa.

One or more control devices 69 can be associated upstream and/or downstream of the shaping assembly 13, only one of which is schematically shown in FIG. 11, which are suitable to check the shape of the containers 100.

Each pressing assembly 16 and 17 (FIGS. 1, 12) is substantially the same as the shaping assembly 13, with the exception of the four conical elements 66 which are here replaced by four vertical bars 70, for example cylindrical, having the function of selectively entering inside a container 100 containing the incoherent material M in order to lightly press it.

The four vertical bars 70 are each disposed along a corresponding vertical axis W. The four vertical axes W are distanced from each other by the same distance D by which the seatings 210 of a same transport member 207 are distanced.

Each pressing assembly 16 and 17 comprises a substantially horizontal support element 71, mounted on a third slider 72 sliding vertically on a vertical guide 73 of the fixed structure 11 and commanded by an eighth actuator 75.

The four vertical bars 70 are mounted on the support element 71 and are vertically mobile, in both directions, along the corresponding vertical axes W between a raised idle position PR3, in which they are distant from the underlying containers 100, and a lowered operating position PO3, in which their ends are partly inserted inside the containers 100 and lightly press the incoherent material M, and vice versa.

It is clear that the travel of each of the four vertical bars 70 depends on the quantity of incoherent material M present inside the corresponding container 100.

Figure 13:
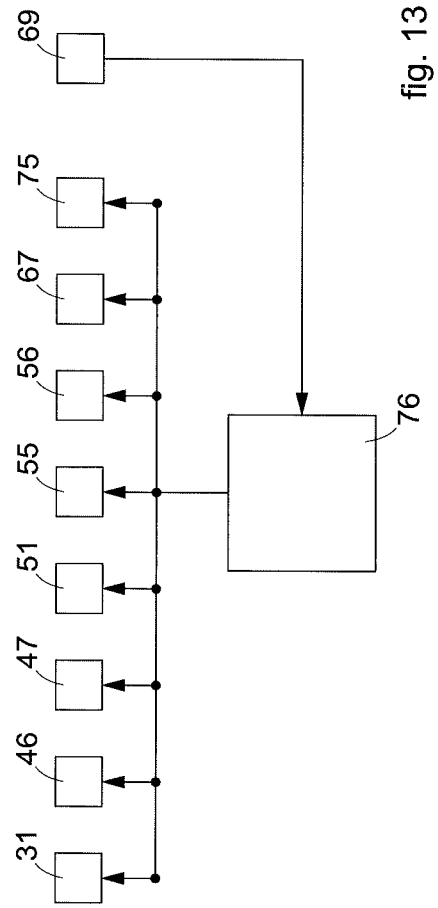
FIG. 13 is an example block diagram of the operation of an electronic control unit of the apparatus of FIG. 1.

The apparatus 10 also comprises means for controlling its operation, for example configured as an electronic control unit 76 (FIG. 13), in particular of the programmable type, which is configured to control one or more, even all, of the actuators 31, 46, 47, 51, 55, 56, 67 and 75, and to receive signals from each control device 69 and/or from other sensors or control devices associated with the different assemblies of the apparatus 10 and not shown in the drawings. The electronic control unit 76, or another control member connected to it, not shown in the drawings, for example another control unit of the machine 200, can also command the transport apparatus 205.

In general, any movement made by using any one of the actuators mentioned above can be obtained by means of an electric motor, or any other type of actuation, for example pneumatic or fluid dynamic.

Furthermore, every movement of the various components of the work units described above can be slave to one or more control devices of a known type and not shown in the drawings, which can send one or more feedback signals to the electronic control unit 76 so that the latter can control the different actuators in order to optimize the method for filling the different containers 100.

The operation of the apparatus 10 described heretofore, which corresponds to the method according to the present invention, comprises the following steps.

Starting from an initial condition in which all the work units described above are in their idle positions, in order to automatically fill a plurality of containers 100 with the incoherent material M, the electronic control unit 76 (FIG. 2) commands, directly or indirectly, the transport apparatus 205 so that a first transport member 207 with four containers 100 on board (FIG. 1), which are positioned in the respective seatings 210, moves into a first shaping station A1, exactly below the shaping assembly 13, with the axes Y of the four seatings 210 aligned with the four vertical axes R of the conical elements 66.

The control devices 69 (FIG. 11) check the shape of each empty container 100 and signal to the electronic control unit 76 the presence of any defective containers 100, so that the latter are not filled, thus preventing any waste of incoherent material M.

The electronic control unit 76 then commands the shaping assembly 13 (FIGS. 1, 10 and 11) so that it carries out a shaping step, during which the seventh actuator 67 (FIG. 11) lowers the second slider 63, together with the four conical elements 66 mounted thereon, from the idle position PR2 to the operating position PO2. In this way, the first conical elements 66 go inside the containers 100 and thus eliminate any wrinkles or folds, after which they return to their idle position PR2.

The shaping step described above is carried out in the cycle time TC of approximately two seconds.

Once the shaping step described above has been completed, the first transport member 207 (FIG. 1) is displaced by one pitch PT toward the first filling assembly 12, that is, toward the right in the direction of working X. In the example provided here, the pitch PT is equal to four times the distance D between two adjacent seatings 210 of the transport member 207. In this way, the first transport member 207 reaches a first filling station A2, exactly below the four delivery devices 22 and above the weighing unit 23. At the same time, a second transport member 207 is taken into the first shaping station A1, where the shaping assembly 13 will carry out a shaping step, like the one described above, in another four corresponding containers 100 which are located in the seatings 210 of the second transport member 207.

In the first filling station A2 the four axes Y of the four seatings 210 of the first transport member 207 are coincident with the four vertical axes V (FIG. 5).

In the displacement toward the first filling station A2, the containers 100 disposed inside the seatings 210 slide with their second end 102 on the inclined wall 61 (FIGS. 5 and 6) and they are raised until they rest at the upper part on the weighing members 60, stopping in a substantially central position thereof.

The electronic control unit 76 then commands a first weighing step, in which the containers 100, still empty, are weighed, detecting the weight, that is, the tare, of each one of them, and a substantially simultaneous first delivery step, while it is controlling the shaping step in the first shaping station A1.

In accordance with another embodiment, the electronic control unit 76 activates a corresponding actuator so that it raises the four weighing members 60 in order to take them against the corresponding first ends 102 of the containers 100, and then adequately lifts the containers 100 in order to detect the weight of each one of them.

At the same time, the electronic control unit 76 commands the start of a delivery step, in particular of a first filling sub-step, in which first of all the sixth actuator 56 lowers the mobile structure 19 to thus take the lower parts 53 of the conveying members 52 inside the second ends 103 of the containers 100 (operating position PO1 in FIG. 9). Advantageously, the electronic control unit 76 can command the sixth actuator 56 in order to lower the mobile structure 19 so that the pointed ends 54 (FIGS. 5 and 7) of the lower parts 53 enter first in the second ends 103 of the containers 100 starting substantially from the center of the latter, while the first transport member 207 is still moving toward the first filling station A2. In this way, the relative motion between the lowering of the pointed ends 54 and the advance of the containers 100 allows the possible remodeling of the second ends 103 of the containers 100 by means of the lower parts, and prevents the generation of wrinkles or folds in the containers.

We must clarify that the first filling sub-step is performed while the electronic control unit 76 continues to keep the weighing step active, so that the weight of each container 100 associated with a corresponding weighing unit 60 is continuously detected.

Immediately afterward, or simultaneously, the electronic control unit 76 commands the activation of the actuators 31, 46, 47, 51 and 55 which drive, respectively, the movement elements 30 inside the hopper 21, the agitation members 49 inside the conveying cavities 33, the metering rollers 40 and 41 and the conveying members 52, thus carrying out a first metered filling of a desired quantity of incoherent material M inside the containers 100.

In some embodiments of the present invention, the electronic control unit 76 can selectively activate each of the first actuators 31 so that inside the corresponding conveying cavity 33 there is always a determinate quantity of incoherent material M on the corresponding first metering roller 40.

Furthermore, in some embodiments of the present invention, the electronic control unit 76 can selectively activate the fourth actuator 51 in order to drive the agitation members 49 with a periodic timing, even with a period greater than the cycle time TC.

In the embodiment shown in FIG. 1, the complete filling of the containers 100 is carried out using the three filling assemblies 12, 14 and 15, whereby, in this first filling sub-step, approximately one third of the total quantity of incoherent material M is inserted in each container 100, that is, for example, approximately 0.30-0.33 grams.

In particular, in each delivery device 22, the downward sliding of the incoherent material M into the conveying cavity 33 is optimized by the agitation member 49. Each first metering roller 40, by means of the sharp elements 42, collects the incoherent material M present in the conveying cavity 33 and transports it toward the second metering roller 41, which pushes it toward the exit aperture 36. The vibration of the underlying conveying member 52 facilitates the sliding of all the incoherent material M toward the corresponding container 100.

It should be noted that, regardless of the quantity of incoherent material M that is delivered in the unit of time by each feed member 27 toward the corresponding conveying cavity 33, the actual quantity of incoherent material M delivered in each container 100 is directly proportional to the amplitude of the rotation of each first metering roller 40 and it is constantly measured by the corresponding weighing member 60.

In fact, the electronic control unit 76, during each filling sub-step, continues to carry out the weighing step and, when the desired weight of the container 100 has been reached, it stops the delivery of incoherent material M, deactivating the corresponding actuators 31, 46, 47, 51 and 55. Immediately thereafter, the electronic control unit 76 commands the sixth actuator 56 in order to return the mobile structure 19 upward into the idle position PR1 (FIG. 8).

The end of each filling sub-step for each delivery device 22 is commanded by the electronic control unit 76, both on the basis of the data supplied by the weighing members 60 during the weighing step, and also on the basis of statistical data which give a prediction on the quantity of incoherent material M that is actually conveyed inside the containers 100 after the stop command of the first and second metering rollers 40 and 41, thus allowing to obtain a very precise metering of incoherent material M in each of the containers 100. In fact, as a function of the vertical distance between the metering rollers 40 and 41, which lie on different horizontal planes (P1 and P2), and the containers 100, there could be a residual quantity of non-uniform incoherent material M which falls into the latter after the metering rollers 40 and 41 have been stopped.

The first filling sub-step and the corresponding weighing step described above are also carried out overall in the cycle time TC of about two seconds.

Once these steps have been completed, the first transport member 207 (FIG. 1) is further displaced by one pitch PT toward the first pressing assembly 16, that is, toward the right in the direction of working X. In this way, the first transport member 207 reaches a first pressing station A3, exactly below the four vertical bars 70. At the same time, a third transport member 207 is taken into the first shaping station A1, where the shaping assembly 13 will carry out a shaping step, like the one described above, in four other corresponding containers 100 which are located in the seatings 210 of the third transport member 207, and the second transport member 207 is taken into the first filling station A2, where the first filling assembly 12 will carry out a first filling sub-step and a simultaneous weighing step, like the ones described above, in four other corresponding containers 100 which are located in the seatings 210 of the second transport member 207.

In the first pressing station A3, the four axes Y of the four seatings 210 of the first transport member 207 are coincident with the four vertical axes W of the vertical bars 70 of the first pressing assembly 16.

The electronic control unit 76, while it commands the shaping and weighing steps, and the first delivery sub-step in the two stations A1 and A2, as described above, also commands a first pressing step in the first pressing station A3, by means of the first pressing assembly 16. In particular, the electronic control unit 76 commands the eighth actuator 75 (FIGS. 1 and 12) in order to lower the four vertical bars 70 from the idle position PR3 to the operating position PO3, and to partly insert them inside the corresponding containers 100 in order to perform a light pressing of the incoherent material M contained therein, without flattening it excessively, but making it more uniform.

Subsequently, the electronic control unit 76 commands the eighth actuator 75 in order to return the four vertical bars 70 to the idle position PR3. This first pressing step is also carried out in the cycle time TC of approximately two seconds.

In accordance with one embodiment of the present invention, it is provided that after the first pressing step there follow a second filling sub-step with correlated weighing step, and possibly a third filling sub-step with corresponding weighing step.

In the example provided here, in the second filling sub-step the electronic control unit 76 commands the second filling assembly 14 in order to insert about half of the total quantity of incoherent material M in each container 100, that is, for example, approximately 0.5 grams. In the third filling sub-step, the electronic control unit 76 commands the third filling assembly 15 in order to insert in each container 100 the complementary quantity of incoherent material with respect to the material already present inside it, in order to reach the total quantity of incoherent material M provided. In the example provided here, this complementary quantity can be equal to approximately 0.2 grams.

In an alternative embodiment, the apparatus 10 can comprise only the first and the second filling stations, in correspondence with which the corresponding filling sub-steps are carried out, since it does not have the third filling station and the corresponding third filling sub-step. In this case, it is evident that the second quantity of incoherent material delivered by the second filling station is complementary to the first quantity of incoherent material delivered by the first filling station with respect to the desired metered quantity.

Furthermore, if three filling sub-steps and as many weighing steps are provided, between the second and the third of these a second pressing step is carried out, by means of the second pressing assembly 17 (FIG. 1).

In this case, one proceeds in the same way as described above, displacing all the support members 207 by one pitch PT at a time from left to right, until the first of them, and then all the others, is taken first into a second filling station A4, in correspondence with the second filling assembly 14, where a second weighing step and a second filling sub-step, substantially the same as the first weighing step and the first filling sub-step described above, can possibly be carried out; then into a second pressing station A5, in correspondence with the second pressing assembly 17, where a second pressing step, substantially the same as the first pressing step described above, can possibly be carried out; finally, into a third filling station A6, in correspondence with the third filling assembly 15, where a third weighing step and a third filling sub-step, substantially the same as the first weighing step and the first filling sub-step described above, can possibly be carried out.

At the end of all the steps, the containers 100 will have been filled with the desired quantity of incoherent material M and the support members 207 can be transferred from the apparatus 10 to the adjacent packaging station 202 (FIG. 2) of the machine 200, for example, by means of the transport apparatus 206.

The electronic control unit 76, suitably programmed, is able to simultaneously manage all the different steps of shaping, folding, delivery, including the various sub-steps of progressive filling, and pressing described above, in coordination with the advance of the transport members 207 along the fixed guide 209.

Therefore, all the purposes disclosed above are achieved by the filling apparatus 10 and by the filling method described above, including the precision of the filling of each container 100 with incoherent material M and the high hourly productivity of approximately 7,000 filled containers 100, which corresponds to a similar quantity of finished products.

It is clear that modifications and/or additions of parts or steps may be made to the filling apparatus 10 and method for automatically filling containers as described heretofore, without departing from the field and scope of the present invention as defined by the claims.

For example, in a simplified embodiment of the present invention, each filling assembly 12, 14 and 15 could have a number of delivery devices 22 different from four, that is, even just one, or many more than four, as well as similar shaping and pressing assemblies.

It is also clear that, although the present invention has been described with reference to some specific examples, a person of skill in the art shall certainly be able to achieve many other equivalent forms of filling apparatus and method for automatically filling containers, all coming within the field of the present invention. In the following claims, the sole purpose of the references in brackets is to facilitate reading and they must not be considered as restrictive factors with regard to the field of protection defined by the claims.

The invention claimed is:

1. Filling apparatus for filling containers with a desired metered quantity of an incoherent material of a fibrous type, comprising a first filling station comprising a first filling assembly, having one or more delivery devices which are configured to deliver a first quantity of incoherent material into each of said containers, wherein said apparatus is wherein it also comprises at least a second filling station disposed downstream of said first filling station along a working line and comprising a second filling assembly having additional one or more delivery devices, which are configured to deliver a second quantity of said incoherent material into each of said containers, into which said first quantity of incoherent material has already been delivered in said first filling station, and in that it also comprises pressing means disposed downstream of said first filling station and configured to be selectively inserted inside said containers after said first quantity of incoherent material has been delivered, in order to press it before delivering said second quantity of incoherent material in said second filling station.

2. Filling apparatus as in claim 1, wherein it also comprises a third filling station disposed along said working line downstream of said second filling station and comprising a third filling assembly having additional one or more delivery devices, which are configured to deliver a quantity of incoherent material which is complementary with respect to the sum of said first and second quantities, so as to obtain the desired metered quantity of incoherent material.

3. Filling apparatus as in claim 2, wherein said pressing means comprise first pressing members and second pressing members, which are disposed, respectively, in a first pressing station and in a second pressing station, wherein said first pressing station is disposed downstream of said first filling station and upstream of said second filling station to press said first quantity of incoherent material, and said second pressing station is disposed downstream of said second filling station and upstream of said third filling station to press said second quantity of incoherent material.

4. Filling apparatus as in claim 1, wherein each of said delivery devices comprises weighing means to weigh said incoherent material, and in that it also comprises control means configured to command said delivery devices as a function of the weighing carried out by said weighing means in order to progressively deliver, as said containers advance along said working line, the desired metered quantity of incoherent material.

5. Filling apparatus as in claim 1, wherein it also comprises shaping means disposed upstream of said first filling station and configured to be selectively inserted in said empty containers in order to eliminate any wrinkles, or folds, present therein.

6. Filling apparatus as in claim 1, wherein each of said delivery devices comprises a first rotating member and a second rotating member which define means for metering the incoherent material and are configured to cooperate with each other so as to deliver a determinate metered quantity of said incoherent material into each of said containers, which is equal to a fraction of said desired metered quantity, and in that said first rotating member and said second rotating member are configured to rotate at respective angular velocities, different from each other, and in directions of rotation opposite each other, so that together they convey said incoherent material toward said containers.

7. Filling apparatus as in claim 6, wherein each of said delivery devices comprises a conveying member having substantially the shape of a funnel, with a wider part at the top, disposed below the first and second rotating members, and a narrower part at the bottom, configured and sized to be selectively inserted into one of said containers, and in that said conveying member is configured to be made to vibrate during the delivery of said incoherent material, so as to prevent the incoherent material that has been delivered by said first and said second rotating members from accidentally remaining inside the conveying member.

8. Filling method for automatically filling containers with a desired metered quantity of an incoherent material of the fibrous type, comprising a delivery step in which one or more delivery devices deliver into each of said containers a determinate quantity of said incoherent material which is a fraction of said desired metered quantity, wherein said delivery step comprises a first sub-step of filling said containers with a first quantity of said incoherent material, carried out in a first filling station comprising a first filling assembly which comprises at least one of said delivery devices, said method being wherein it comprises at least a second sub-step of filling said containers with a second quantity of said incoherent material, carried out in a second filling station disposed downstream of said first filling station along a working line and comprising a second filling assembly having additional one or more delivery devices which are configured to deliver a second quantity of said incoherent material into each of said containers, in which said first quantity of incoherent material has already been delivered in said first filling sub-step, and in that it also comprises a pressing step, subsequent to said first filling sub-step, carried out by means of pressing means disposed downstream of said first filling station, in which said pressing means are selectively inserted inside said containers already at least partly filled with said incoherent material in order to press the incoherent material.

9. Filling method as in claim 8, wherein said delivery step also comprises a third filling sub-step, carried out in a third filling station which is disposed along said working line downstream of said second filling station and comprises a third filling assembly having additional one or more delivery devices, which are configured to deliver a quantity of incoherent material which is complementary with respect to the sum of said first and second quantities so as to obtain the desired metered quantity of incoherent material.

10. Filling method as in claim 9, wherein, in said first filling sub-step it is provided to deliver a first quantity comprised between 25% and 35% of said desired metered quantity of incoherent material, in said second filling sub-step it is provided to deliver a second quantity comprised between 45% and 55% of said desired metered quantity of incoherent material, and in said third filling sub-step it is provided to deliver a quantity comprised between 15% and 25% of said desired metered quantity of incoherent material.

11. Filling method as in claim 9, wherein said pressing step comprises a first pressing step carried out by first pressing members in a first pressing station disposed downstream of said first station filling and upstream of said second filling station, to press said first quantity of incoherent material, and a second pressing step carried out by second pressing members in a second pressing station disposed downstream of said second filling station and upstream of said third filling station, to press said second quantity of incoherent material.

12. Filling method as in claim 8, wherein it also comprises a shaping step, before said delivery step, carried out by means of shaping means disposed upstream of said first filling station, wherein in said shaping step it is provided to selectively insert said shaping means into said empty containers in order to eliminate any wrinkles, or folds, present in said containers.

13. Filling method as in claim 8, wherein it comprises delivering said quantities of incoherent material by making rotate a first rotating member and a second rotating member, which are comprised in each of said delivery devices and are cooperating reciprocally, and in that it also comprises making rotate a conveying member comprised in each of said delivery devices, having substantially the shape of a funnel with a wider part at the top, disposed below said first and second rotating members, and a narrower part at the bottom, configured and sized to be selectively inserted into one of said containers.

14. Filling method as in claim 8, wherein it comprises a weighing step in which it is provided to weigh said incoherent material by means of weighing means which are comprised in each of said delivery devices, and in that it also comprises a step of controlling the delivery step by means of control means which are configured to command said delivery devices as a function of the weighing carried out by said weighing means in order to progressively delivery, as said containers advance along said working line, the desired metered quantity of incoherent material.

15. Filling method as in claim 8, wherein it comprises a step of transporting said containers by means of a transport apparatus comprising a transport member configured to slide on a fixed guide, wherein said transport step provides to transport said containers along said working line parallel to a direction of working, passing sequentially at least in said first filling station and in said second filling station, and stopping in each of them for an amount of time equal to the cycle time, so as to allow the partial and progressive filling of said containers.

* * * * *